Figure 1:
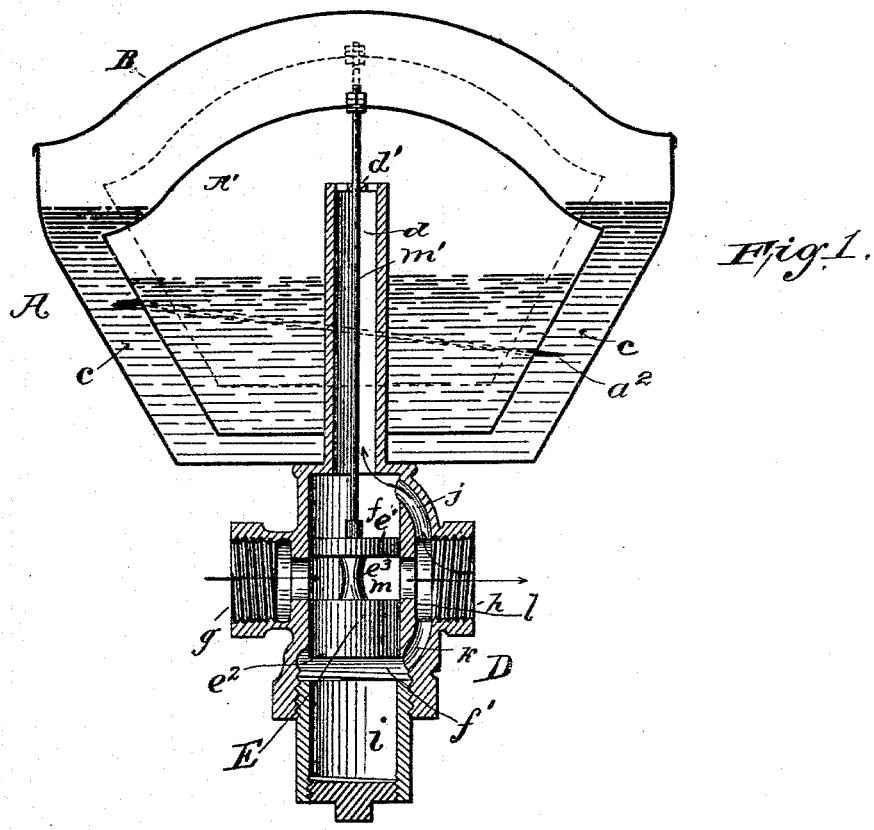

(No Model.)

J. C. RICHARDSON.
VALVE FOR GAS SAVING REGULATORS.

No. 515,968. Patented Mar. 6, 1894.

Attest:
C. W. Benjamin
Arthur L. Kent

Inventor:
Jay C. Richardson
by D. Walter Brown
his atty

UNITED STATES PATENT OFFICE.

JAY C. RICHARDSON, OF NEW YORK, N. Y., ASSIGNOR TO THE UNION NATIONAL GAS SAVING COMPANY, OF SAME PLACE.

VALVE FOR GAS-SAVING REGULATORS.

SPECIFICATION forming part of Letters Patent No. 515,968, dated March 6, 1894.

Application filed March 29, 1893. Serial No. 468,237. (No model.)

*To all whom it may concern:*

Be it known that I, JAY C. RICHARDSON, a citizen of the United States, and a resident of New York, in the county of New York and State of New York, have invented certain new and useful Improvements in Valves for Gas-Saving Regulators, of which the following is a specification.

My invention relates to improvements in valves for gas saving regulators, and it is the purpose of my invention to provide a valve to be operated by the rise and fall of the regulating float, and so constructed and arranged that when open it shall furnish a straightway passage through the valve, and shall at all times, whether the valve be open or closed have an open relief vent from the burner side of the valve to under the float, so that the float shall be operated by the pressure in the pipes leading to the burners, which I term the outlet pressure, and not by the pressure in the street mains, and thereby the motions of the float and valve be regulated according to the demand at the burners, and not be subject to the frequent and great fluctuations of pressure in the street mains.

It is also a further object of my invention to provide a balanced valve, so arranged that pressure of the gas thereon is equalized, and has no tendency to resist the effort of the float to move the valve. This is of great practical importance in securing the quick and sensitive operation of the valve and float, and has never, so far as I am aware, been attained, completely.

When the pressure in the street mains is admitted to under the float directly, as in the patent to Benjamin E. Patterson, dated January 3, 1893, the actions of the float become very unsteady, because the street pressure is subject to frequent and great variations. But by my arrangement of the valve the street pressure is not admitted directly under the float, and the float is actuated by the pressure in the burner supply pipes, this pressure varying according to the demand for gas at the burners, and the variation being within comparatively small limits, and comparatively regular. Thus the actions of the float and valve become steady, flickering at the burner is obviated, and the pressure always retained at a normal limit,—in practice usually one-half inch of water pressure.

My invention also provides a drip chamber for the escape of the products of condensation, which accumulate in the house pipes, and would otherwise collect around the valve, thereby impeding or obstructing its free mechanical action.

Figure 2:
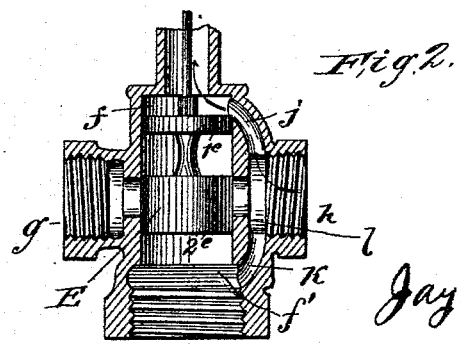

Referring to the drawings, which accompany the specification, to aid the description: Figure 1 is a sectional elevation of a gas saving regulator, provided with my valve. The valve is shown wide open. Fig. 2 is a sectional detail of the valve, and showing the same closed.

The gas regulator body A, float A', cover B, glycerine, or mercury C, are all as are common in gas-saving regulators, and are not claimed by me, but are shown merely to illustrate the application of my valve to any suitable regulator. My valve proper is attached to the base of the regulator, as shown, and consists of the valve body D, and straightway valve E. Said body D, has the chamber $f$, which communicates with the tube $d$, that leads up with open top to under the float A', is bored true to fit the valve E, is provided with inlet, $g$, outlet, $h$, to burners, and drip chamber $i$. On the burner side of the valve, and communicating with the outlet, $h$, is a small port $j$, which rises to near the top of the chamber $f$. This is the relief port, and controls the motion of the float A', as will be hereinafter described. From the lower side of the outlet $h$, is formed a drip port $k$, which descends nearly to the bottom of the chamber $f'$, and communicates with the drip chamber $i$. The valve body is fashioned with a ledge, $l$, at the upper end of the port $k$, which besides furnishing additional bearing for the valve E, also prevents the products of condensation from working back into the chamber $f$.

The aforesaid valve E has, as stated, a straightway passage, $m$, and is conveniently formed of two disks, $e'$, $e^2$, fixed on a stem, $e^3$. The upper disk, $e'$, is of comparatively little thickness, so as to have sufficient play, without closing the upper end of the relief $j$; and the lower disk, $e^2$, is of considerable thickness, so as to be able to reciprocate without leaving the wall of the chamber $f'$. For lightness the disk $e^2$ is preferably hollowed out, as indicated. From the upper disk, $e'$, a stem, $m'$, rises through the tube, $d$, being guided by a hole in the cross bar $d'$, and is attached by nuts and washers to the float $A'$. Said float $A'$ being, as is well understood, an inverted cup. In Fig. 1, I show said float $A'$ as provided with a helix blade, $a^2$, to steady the float, and give it a revolving motion, as described and claimed in my application for Letters Patent of the United States, executed by me the 30th day of January, 1893. But, of course, I can use my valve with any other suitable float.

The operation is as follows: Suppose there is no gas pressure entering the valve; then the float $A'$ will descend in the glycerine, and the valve will be wide open, as in Fig. 1, presenting a straightway passage for the gas when admitted. Now gas is admitted, quickly increasing the pressure in the outlet pipes. A small percentage of this pressure enters through the vent, $j$, to the float $A'$, which therefore rises and lifts the valve E to the position of Fig. 2, where the port through the valve body is closed. But the relief vent, $j$, is still open, and the pressure in the outlet pipes sustains the float $A'$. Now as additional burners are lighted, the demand for gas diminishes the pressure in the outlet pipes, this diminishes the pressure under the float $A'$, by the port $j$, and the said float $A'$ naturally descends, opening the valve. But a little more gas entering the outlet pipes, the pressure therein increases, which affects the float $A'$, by way of the port $j$, and the same rises, thereby again closing the valve. Thus, in practice, the action of the valve is regulated with great nicety and regularity by the reduced pressure on the outlet side, independent of the constant variations in the street main, resulting in a uniform pressure at the burners, with correspondingly improved illumination and consequent economy in gas consumption. The port $k$, conveys away the products of condensation, and the said helix blade $a^2$ on the float $A'$ gives to the valve as it rises and falls a rotary motion, which also tends to keep it from sticking.

It will be evident that the construction of the valve with the two disks $e'$, $e^2$, of equal area, insures a perfect balance, and consequently the gas pressure imposes no resistance to the action of the valve.

Now, having described my improvement, I claim as my invention—

1. In gas saving regulators, the combination of a float chamber, a float therein, a valve chamber having inlets and out-lets attached thereto, a straightway piston valve having disks of equal area arranged in said valve chamber and operatively connected with said float, and ports from the out-let side of said valve chamber connecting respectively with the float chamber and the space beneath said piston valve, substantially as described.

2. In gas saving regulators the combination of a float chamber, a float therein, a valve chamber provided with inlets and outlets attached thereto, a straightway piston valve in said valve chamber operatively connected with said float, a port from the outlet side of said valve chamber connecting with the float chamber, and another port also from the outlet side of said valve chamber provided with a ledge at its upper end and connecting with the space beneath said piston valve, substantially as described.

3. In gas saving regulators and in combination with a float chamber, float, and valve chamber, a straightway piston valve having two disks of equal area arranged in said valve chamber on a stem which is connected with the float, a gas relief port in the outlet side of said valve chamber extending to a point beyond the extreme throw of said valve and there communicating to the under side of said float, and a drip port also in the outlet side of said valve chamber and communicating with the space beneath said valve, substantially as described.

In testimony that I claim the foregoing as my invention I have signed my name, in presence of two witnesses, this 8th day of March, 1893.

JAY C. RICHARDSON.

Witnesses:
JOHN J. COLLINS,
SILAS H. MOORE.